United States Patent [19]

Coombes et al.

[11] Patent Number: 4,531,533
[45] Date of Patent: Jul. 30, 1985

[54] SEISMIC TRIGGER

[76] Inventors: Graham E. Coombes, 1201 St. Joseph Ave., Los Altos, Calif. 94022; Austin J. Lemoine, 1020 Guinda St., Palo Alto, Calif. 94301

[21] Appl. No.: 570,575

[22] Filed: Jan. 13, 1984

[51] Int. Cl.³ .............................................. F16K 17/36
[52] U.S. Cl. ..................................................... 137/46
[58] Field of Search .............................. 137/38, 45, 46

[56] References Cited

U.S. PATENT DOCUMENTS

| | | | |
|---|---|---|---|
| 3,043,321 | 7/1962 | Hewitt | 137/46 |
| 3,791,396 | 2/1974 | Nelson | 137/38 |
| 4,185,651 | 1/1980 | Paulson | 137/38 |
| 4,314,120 | 2/1982 | Sharp | 137/45 X |

OTHER PUBLICATIONS

Koso Seismic Gas Shut Off Valve, 3/81.
The California valve.

*Primary Examiner*—Robert G. Nilson
*Attorney, Agent, or Firm*—Townsend and Townsend

[57] ABSTRACT

An apparatus which is provided for closing a fluid valve in response to initial movement, as for example caused by a seismic disturbance, which is removably mountable to existing inline valves, such as gas valves. The apparatus includes a trigger which is responsive to seismic movement, particularly at a resonant frequency, to release a pressurized fluid supply which in turn drives a mechanical actuator to actuate the subject valve through the existing valve coupling. The existing valve coupling is typically a valve stem which must be rotated approximately ninety degrees from an open position to a closed position. The pneumatic drive is sufficiently powerful to actuate valves which are noticeably difficult to actuate manually. The force required to actuate the trigger mechanism is independent of the force required to actuate the valve, in accordance with the invention. In a specific embodiment, the trigger mechanism comprises a weight mounted in an inverted pendular fashion on a coil extension spring which is free to move laterally in all directions in one general plane, the coil extension spring being generally compressed such that lateral movement of the weight results in a limited amount of axial lengthening.

9 Claims, 9 Drawing Figures

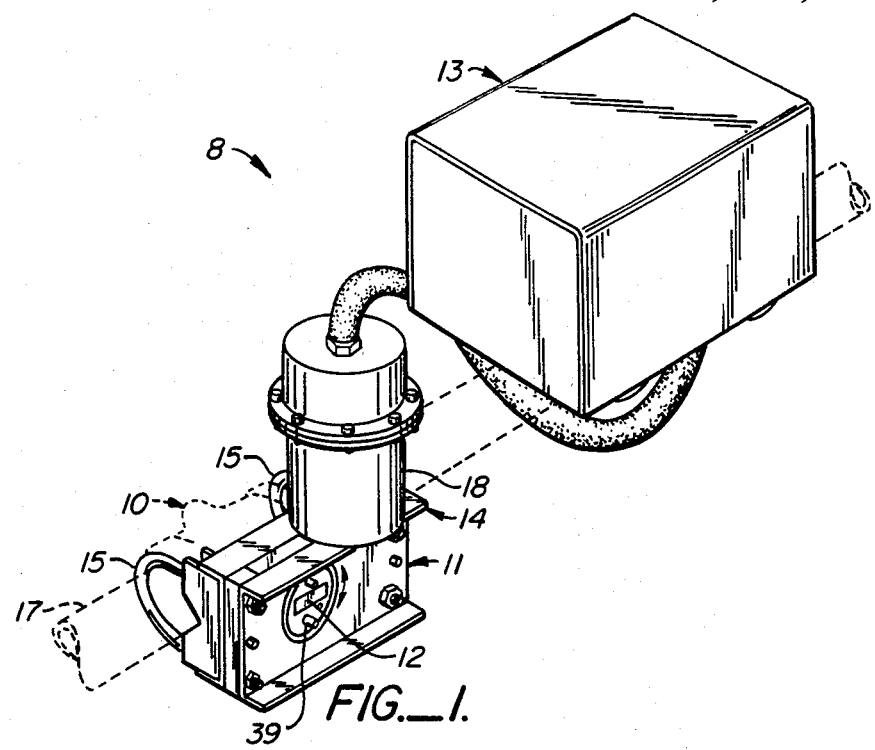
FIG._1.
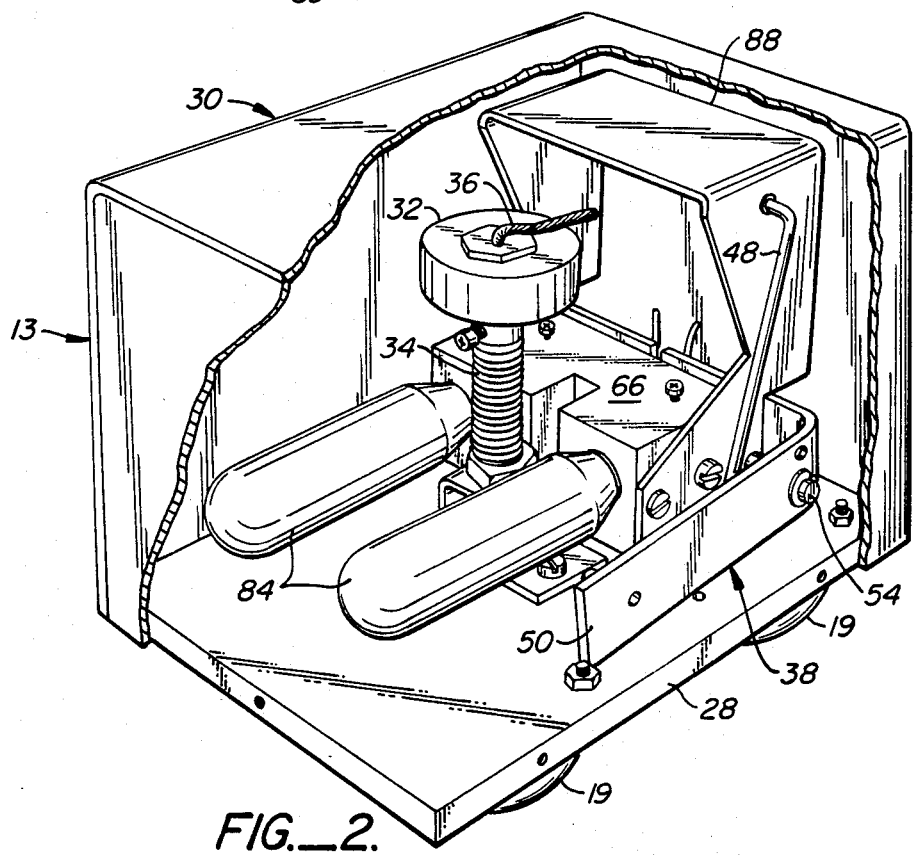
FIG._2.

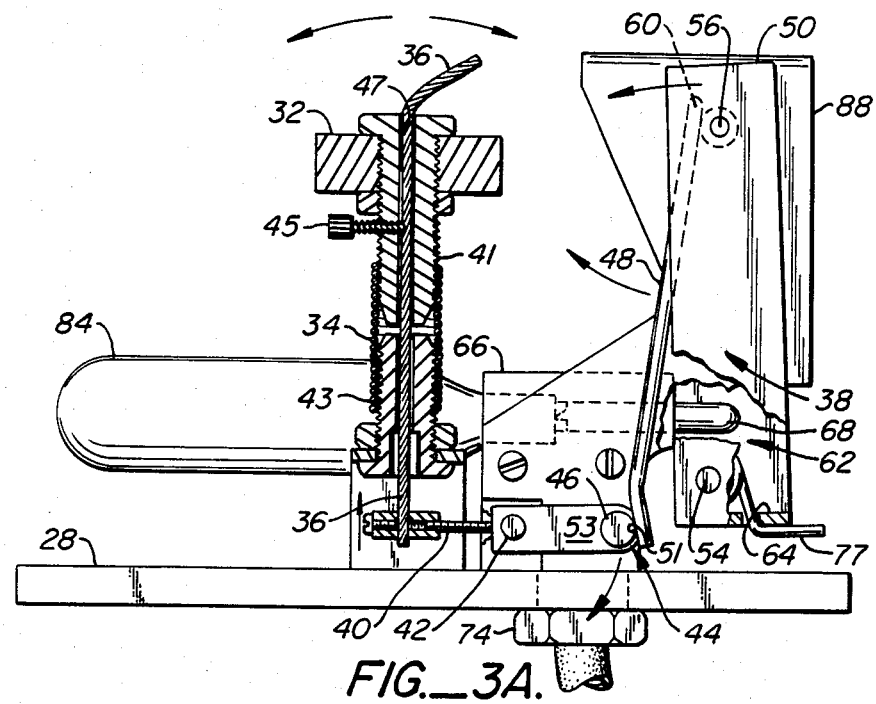
FIG._3A.
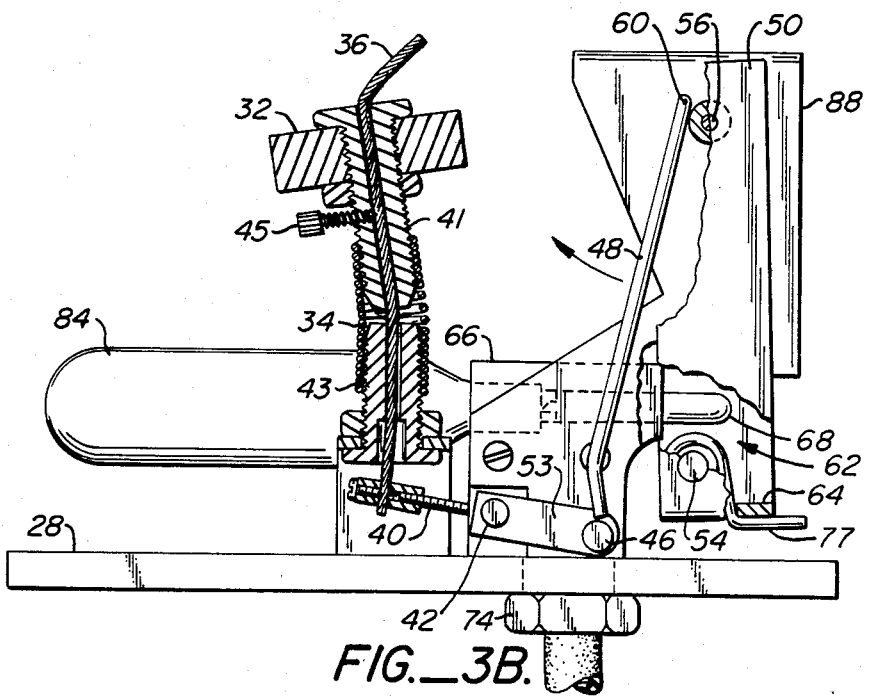
FIG._3B.

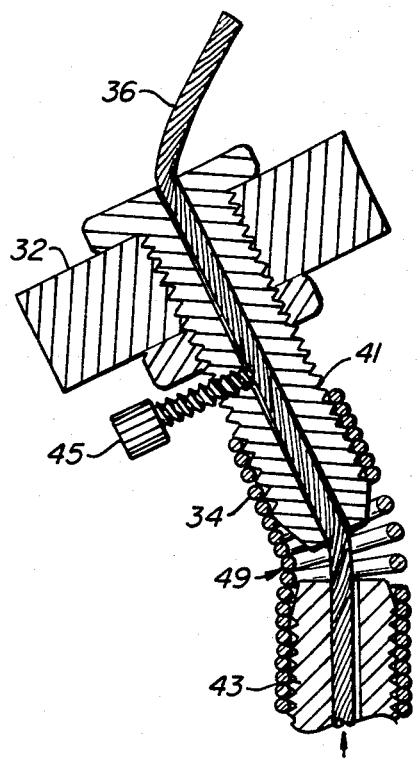
FIG._3C.
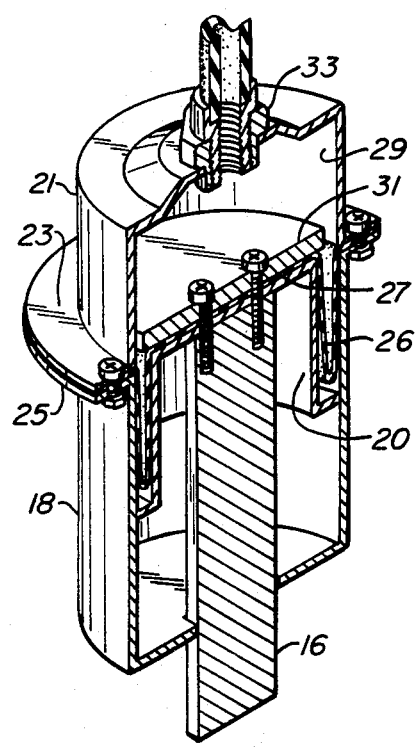
FIG._6.
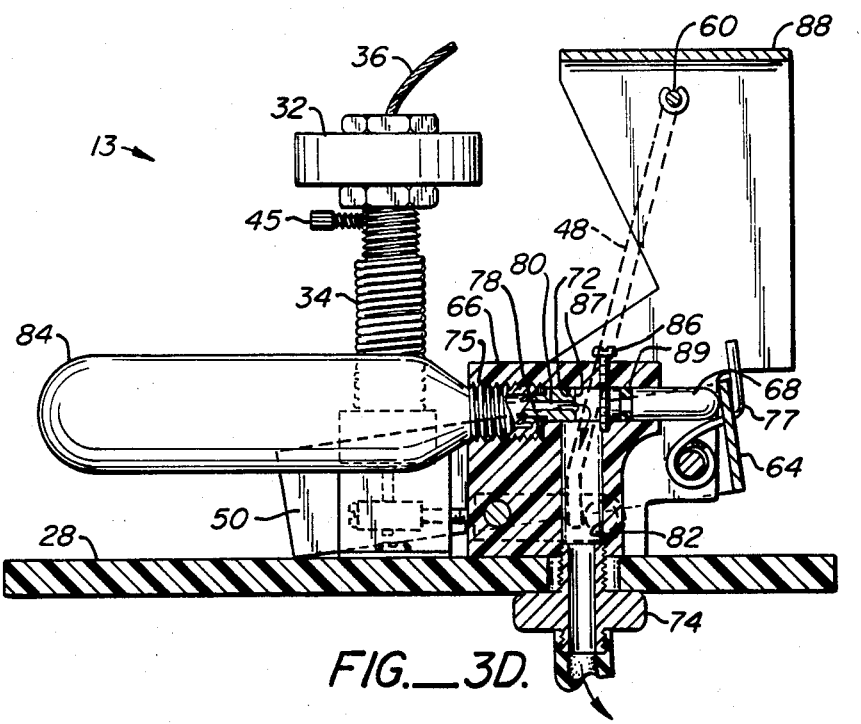
FIG._3D.

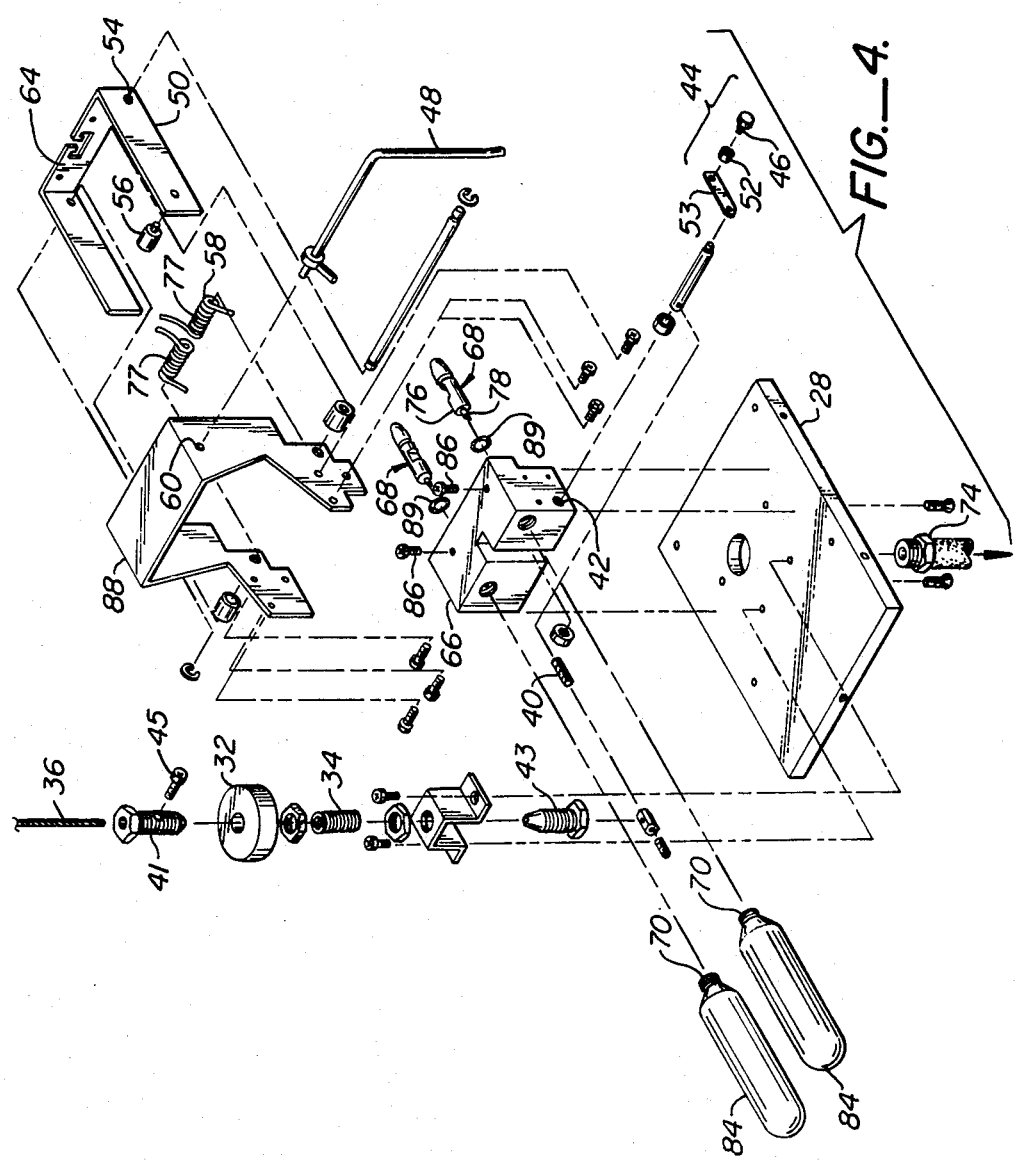
FIG._4.

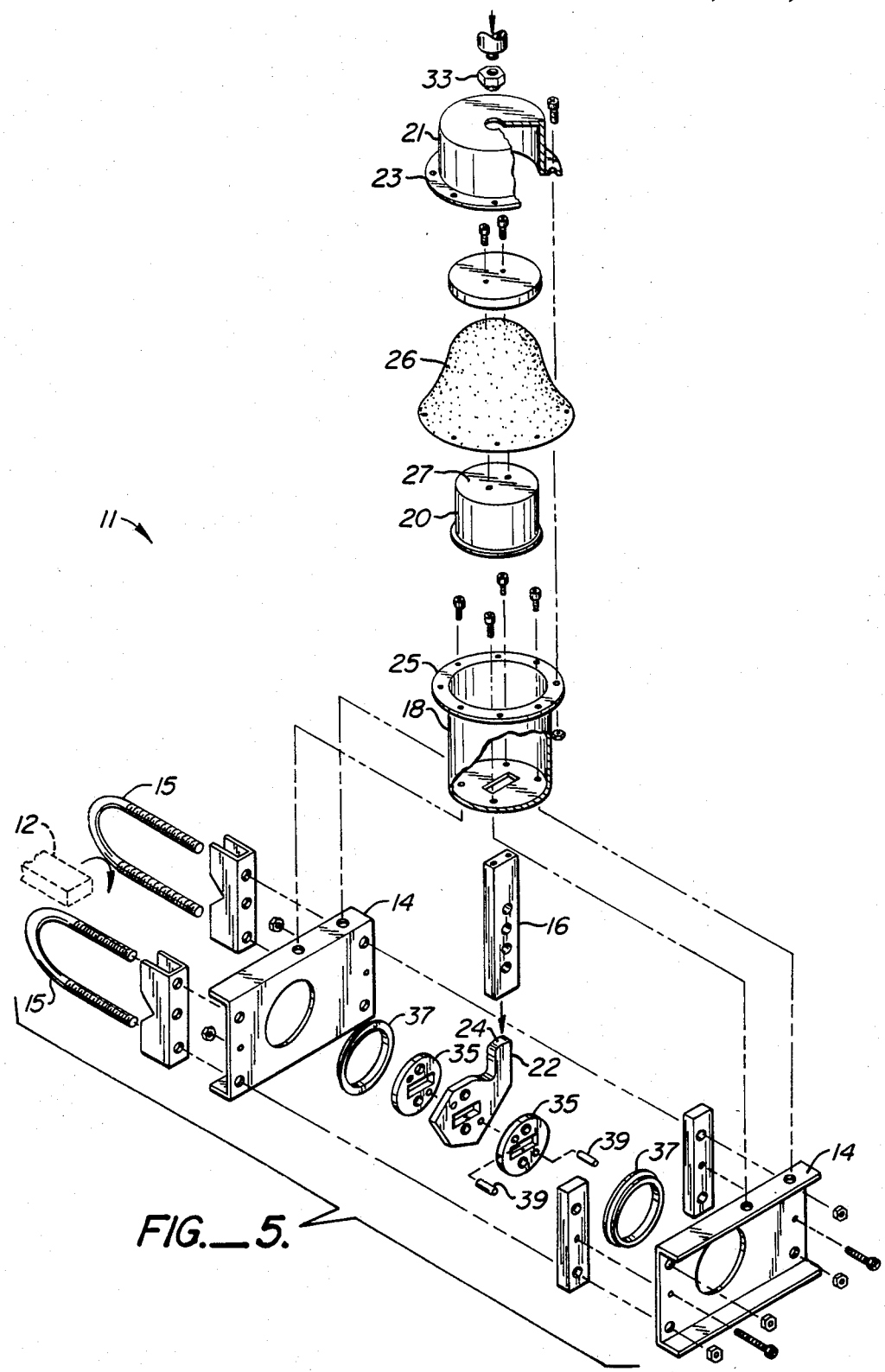
FIG._5.

SEISMIC TRIGGER

BACKGROUND OF THE INVENTION

1. Field of the Invention

This invention relates to motion sensitive valves and in particular to shut-off valves for use in the event of seismic disturbances.

It is well known that earthquakes and other disturbances can displace gas, water and utility lines, causing breakage or rupture, which leads to subsequent damage due to leakage or fire. Attempts have been made in the past to provide safety cut-off valves for controlling for example the flow of natural gas after line rupture. For the most part, these attempts have not been successful in providing a safety device of simple, inexpensive, reliable and rugged construction capable of being installed on existing mains without the need to insert inline valves. These limitations have severely limited the acceptance of inertially triggered devices in spite of an obvious need for such devices.

One of the principal problems associated with inertially actuated devices is a trigger mechanism capable of satisfying strict seismic response requirements. For example, the American National Standard for Earthquake Actuated Automatic Gas Shut-off Systems (ANSI Z21.70-1981) specifies that the sensing means of a valve or system shall actuate the shut-off means within five seconds when subjected to a horizontal sinusoidal oscillation having a peak acceleration of 0.3 G and a period of 0.4 second. Furthermore, the sensing means shall not actuate the shut-off means when subjected for five seconds to horizontal sinusoidal oscillations having a peak acceleration of 0.4 G with a period of 0.1 second or a peak acceleration of 0.08 G with a period of 0.4 second or a peak acceleration of 0.08 G with a period of 1.0 second. These specifications thus require that the trigger mechanism be effective for a 2.5 Hz oscillation with 0.3 G of force and substantially immune to oscillations outside of a narrow frequency range of a low force level.

In the past, a number of valving solutions have been suggested for use in fluid systems, particularly in natural gas systems. The typical solution requires that the gas line be cut, junctions be threaded and a coupling be inserted in the line containing the seismic-actuated valve. These solutions have proved unsatisfactory for a number of reasons. First, it is particularly undesirable to disturb a gas line in any way because of the risk of leakage. Second, the cost of installation of such a valve can be substantial, since most local building codes require that the installation be subject to inspection and/or be performed by a certified plumber.

State-of-the-art automatic shut-off valves have been found to be unreliable due to false triggering or sticking. As such, such valves are not widely accepted or even recommended by utility companies, particularly gas utility companies.

What is therefore needed is a seismic actuation system and in particular an inertially triggered fluid flow valve control system which can be installed externally of the gas line, operate on existing valves in the gas line, and be able to operate reliably and according to specification.

2. Description of the Prior Art

Line-insertable mechanisms are known which satisfy nationally accepted standards. These mechanisms are generally valves intended to be inserted in gas lines and require professional installation. For example, Koso International of Los Angeles, Calif. manufactures an earthquake actuated shut-off valve approved by the Architectural Board of the State of California. The Koso California (Brand) Valve employs a rolling latch in a cup to hold open a biased valve. The rolling latch is a heavy metal sphere of a first diameter in a cup of a second diameter which is actuated when the sphere is forced from the cup by seismic oscillation.

Another example of a shut-off valve which employs a rolling latch is Paulson U.S. Pat. No. 4,185,651.

Automatic shut-off valves are known which are intended to close the inline plug cock on the gas main. U.S. Pat. No. 3,791,396 to Nelson discloses a shut-off mechanism which employs a spring under tension coupled to a lever mounted to the stem of the plug cock. The Nelson patent employs a weight having a tapered base mounted in a metastable position on a platform. When disturbed, the weight topples thereby pulling upwards on a chain and causing a latch assembly to effect the release of a lever extension with the resulting closing of the plug cock valve. The Nelson device cannot fit in small spaces because it must be mounted along a substantial length of gas pipe and must employ a powerful spring attached to a lever on the plug cock. Furthermore, the trigger mechanism is susceptible to failure due to binding in the latch assembly from the high forces of friction and the high pressures exerted on the valve lever. The Nelson patent has the further disadvantage of requiring that the latch be able to withstand substantially the same pressure exerted on the lever.

SUMMARY OF THE INVENTION

According to the invention, an apparatus which is provided for closing a fluid valve in response to initial movement, as for example caused by a seismic disturbance, which is removably mountable to existing inline valves, such as gas valves. The apparatus includes a trigger which is responsive to seismic movement, particularly at a resonant frequency, to release a pressurized fluid supply which in turn drives a mechanical actuator to actuate the subject valve through the existing valve coupling. The existing valve coupling is typically a valve stem which must be rotated approximately ninety degrees from an open position to a closed position. The pneumatic drive is sufficiently powerful to actuate valves which are noticeably difficult to actuate manually. The force required to actuate the trigger mechanism is independent of the force required to actuate the valve, in accordance with the invention. In a specific embodiment, the trigger mechanism comprises a weight mounted in an inverted pendular fashion on a coil extension spring which is free to move laterally in all directions in one general plane, the coil extension spring being generally compressed such that lateral movement of the weight results in a limited amount of axial lengthening. The axial lengthening motion is employed followed by mean of a cable attached through the spring, to reciprocally move a lever arm controlling a catch. When the lever arm is sufficiently displaced to release a catch in the mechanism, a firing pin is triggered, which in turn releases pressurized gas from a pneumatic source into the pneumatic cylinder.

The invention will be better understood by reference to the following detailed description taken in connection with the accompanying drawings.

BRIEF DESCRIPTION OF THE DRAWINGS

FIG. 1 is a perspective view showing a valve shut-off device as it might be mounted to an in-line fluid valve on a pipe.

FIG. 2 is a perspective view and partial cutaway of a trigger mechanism in accordance with the invention.

FIG. 3A is a side view in partial cross-section of a trigger mechanism in accordance with the invention in a first position.

FIG. 3B is a side view in partial cutaway of a trigger mechanism in a second position.

FIG. 3C is a side view in cutaway of a sensor mechanism in the second position.

FIG. 3D is a side view and cross-section of a sensing mechanism of the trigger mechanism in accordance with the invention in a third position.

FIG. 4 is an exploded perspective view of the trigger mechanism.

FIG. 5 is an exploded perspective view of the valve actuator.

FIG. 6 is a perspective view and partial cross-section of a valve actuator in accordance with the invention.

DESCRIPTION OF SPECIFIC EMBODIMENTS

Referring to FIG. 1 there is shown a valve shut-off device 8 in accordance with the invention connected to a valve 10. The valve shut-off device 8 comprises in combination a valve actuator 11 which is mounted to a valve stem 12 of the valve 10 and a trigger mechanism 13 for actuating the valve actuator 11. The trigger mechanism 13 may be mounted directly to the valve actuator 11 or it may be mounted elsewhere as is convenient and provided with means for communicating with the valve actuator 11. In particular, the trigger mechanism 13, is in pneumatic communication with the valve actuator 11, as hereinafter explained. The valve actuator 11 may be mounted to the valve 10 by means of a frame 14 attached by U bolts 15 to either side of the valve 10 in-line in a pipe 17.

Similarly, the trigger mechanism 13 may be mounted to the pipe by means of U bolts 19, as shown in FIG. 2. Other mounting configurations may be employed without departing from the true spirit and scope of the invention. Ideally, the trigger mechanism 13 should be mounted in a secure location so as not to be subject to vandalism or accidental disturbance and yet still be sensitive to inertial movements. In the specific embodiment shown in FIG. 2, the structure requires that a reference platform 28 be mounted in a generally or level position so that the trigger mechanism is maximally sensitive to lateral inertial movement in a horizontal plane.

Referring to FIGS. 5 and 6, details of the valve actuator 11 are shown. The valve actuator 11 (FIG. 5) comprises a push rod 16, a cylinder 18, and a piston 20, the piston being reciprocally moveable within the cylinder 18, and the push rod 16 being attached to the piston 20 to communicate the reciprocal movement external of the cylinder 18. A head 21 attaches by means of a flange 23 to a flange 25 of the cylinder 18 to enclose the piston 20. Optionally, a rolling diaphragm membrane 26 is mounted between the flanges 23 and 25 and to a face 27 of the piston 20 to form a fully enclosed chamber 29 in the cylinder 18. A cap 31 or other suitable means may fasten the diaphragm 26 to the face 27 of the piston 20. A fluid coupling 33 is provided for communicating pneumatic fluid to the chamber 29.

The cylinder 18 is mounted to a frame 14 which is rigidly but removably attachable to the pipe 17 (FIG. 1). A stem coupling 22 is provided for converting the reciprocal movement of the push rod into rotary movement to actuate a stem 12 of the valve 10 (FIGS. 5 and 1). The stem coupling 22 includes a lever arm 24 extending from the central axis of rotation of the stem 12, and the stem coupling 22 is mounted for rotation of the valve stem 12 relative to the valve 10 on two bearing spacers 35. Bearings 37 and 39 couple the stem.

The stem coupling 24 may be a cam having a cam lobe which is disposed to confront the end of the push rod 16. The push rod 16 is designed to displace the cam lobe or lever arm 24 at least sufficient to turn the bearing spacers 35 one-quarter turn or ninety degrees. Pins 39 may be provided in the bearing shafts 35 which are externally accessible for manually turning the valve stem 12. Alternatively, a valve stem extension (not shown) could be mounted to allow a standard tool to be used to manually turn the valve stem 12.

Referring to FIGS. 2 through 4 in combination, the trigger mechanism 13 is shown in greater detail. The trigger mechanism 13 includes for example a reference or platform 28 to which is mounted an enclosure 30 enclosing and protecting the operative features of the trigger mechanism 13. The operative features of the trigger mechanism 13 are an inverted pendulum formed by a weight 32 and a coil extension spring 34 together with a cable 36. The coil extension spring 34 is generally a fully compressed coil spring attached at one end to the weight 32, for example, by an adjustment screw 41 forming a portion of the weight. The other end of the spring 34 is attached to the reference platform 28. The spring 34 may for example be mounted around a hollow shaft 43. The cable 36 is fixably attached to the weight 32, for example, at a central cavity 47 by a clamping screw 45 in the adjustment screw 41. The length of the pendulum mechanism formed by the weight 32 and the spring 34 is adjustable to control the natural mode of oscillation. The size of the weight 32 is selectable to the desired activating ground acceleration level and frequency of oscillation.

The resonant frequency of oscillation of the pendular mechanism according to the invention can be approximated from Castigliano's Theorem (J. M. Shigley, *Mechanical Engineering Design*, McGraw-Hill, 1977) by taking into account the modulus of elasticity of the spring material and calculating the appropriate cantilever rate or spring bending rate.

The approximate resonant frequency is given by:

$$f \simeq \frac{1}{2\pi} \sqrt{\frac{g}{(w/k)}}$$

where
w is equal to the weight carried above the spring,
k is the cantilever rate of the spring, and
g is the gravitational acceleration.

The approximate cantilever rate k is given by the formula:

$$k \simeq (.975) \frac{D^2}{l_0^2 + 3l(l - l_0)} k_0$$

where l is the distance from the base of the spring to the center of gravity of the weight carried above the spring, D is the main spring diameter, $l_0$ is the free spring length and $k_0$ is equal to the axial spring rate.

The constant in the above formula arises from an expression for the bending strain energy derived from Castigliano's Theorem. [when the spring material is music wire or stainless steel]

The free spring length in a fully compressed spring is equal to the number of active coils times the wire diameter or $N \times d$.

The axial spring rate $k_0$ is given by the following expression.

$$k_0 = \frac{d^4 G}{8 D^3 N}$$

where

G is the shear modulus of the elasticity of the spring material,

N is the number of active coils,

D is the mean spring diameter and d is the wire diameter.

These expressions may be used to design an appropriate pendulum arrangement.

The invention works best in a fully compressed spring where a fulcrum region 49 is formed by the section of the spring 34 (FIG. 3C) forming the free spring length. The pendulum mechanism in a fully energized position bends about fulcrum region 49 which is off the axis of the cable 36, thereby causing the cable 36 to be displaced relative to the hollow shaft 43 at the base. It is this movement which actuates the trigger mechanism 13.

Referring to FIGS. 3A, 3B, 3C and 3D movement of the cable 36 relative to the reference 28 causes a lever 40 to rotate about a pivot 42 which in turn moves a stop 46 relative to the pivot 42. The stop 46 is part of a catch 44 which retains a second lever 48 holding a third lever 50. The second lever 48 rotates about a pivot 60 closely adjacent a stop 56 mounted to the lever 50 to obtain the mechanical advantage of a long lever. The pivot 60 is on a frame 88 attached to a block 66 on the platform 28. The second lever 48 has an end 51 which is preferably slightly bent to present a force slightly off normal to the tangential surface of the lever to the stop 46. Specifically, the stop 46 may be provided with a bearing 52 which rotates in response to movement of the lever 40 and its extension 53 so that the stop 46 produces minimal friction with the abutting surface of end 51.

The third lever 50 rotates about a pivot 54. The pivot 54 is on the frame 88. The third lever 50 is attached to a trigger plate 64 such that movement of the lever 50 causes the trigger plate 64 to displace between a first position and a second position, the first position being a rest position and the second position being a fully actuated position as shown in FIGS. 3A and 3D, respectively. In the second position, the trigger plate 64 engages a firing pin 68. The firing pin 68 comprises a sharpened point 78 communicating to a hollow shaft 72 through the reciprocally moveable pin 68. The hollow shaft 72 has a passage 80 coupled to a manifold 82 in a block 66, which in turn is coupled to an outlet gas coupling 74. An inlet gas coupling 75 provides a mechanical interface to a pressurized gas source such as canister 84 containing a pressurized fluid. The inlet coupling 75 is blocked by a cap 70 which is intended to be puncturable by the sharpened point 78 upon actuation of the pin 68. The cap 70 may be the seal of the canister 84, and the canister 84 may be mounted to the coupling 75. The third lever 50 and trigger plate 64 are biased by spring means 77, for example torsion springs engaging the trigger plate 64. The piston 74 may be slotted to receive a stop 86 so that the pin 68 cannot be inadvertently repelled out of the block 66 upon release of the pressurized fluid introduced through the cap 70. The hollow shaft 72 is also in communication with the manifold 82 through the slot 87 provided for the stop 86. An O-ring 89 prevents undesired escape of gas through the shaft carrying the piston 76.

When the trigger mechanism actuates, pressurized fluid is released to the manifold 82 and communicated to the utilization device, for example to the gas coupling of the valve actuator 11. It has been found in practice that a 12 G $CO_2$ gas canister containing 850 psi liquified carbon dioxide (at room temperature) provides more than enough pressure to displace a piston of adequate volume to actuate a standard natural gas in-line valve. Such valves typically require forces of 50 to 150 ft. lbs. torque for actuation. Furthermore, the torque applied is in a sufficiently compact configuration to minimize the danger of fracturing the valve or associated pipe. The pressure pulse is sufficiently intense to overcome any initial friction which must normally be overcome to actuate a long unused valve.

One of the great advantages of this invention is that the force required to actuate the trigger mechanism is substantially unrelated to the force required to actuate the valve. A small movement in a lever, such as lever 40 releases a catch 44, which is a minimal friction contact of a stop 46 and a lever 48. The lever 48 is disposed with substantial mechanical advantage relative to a lever 50 which in turn actuates a trigger plate 64 to fire a trigger 68. The trigger 68 releases high pressure gas which in turn can be used to drive a pneumatic actuator. The pneumatic actuator is mechanically coupled to a valve which in turn is operated in accordance with the invention.

The invention has now been explained with reference to specific embodiments. Other embodiments will be apparent to those of ordinary skill in the art without departing from the spirit and scope of the invention. It is therefore not intended that this invention be limited accept as indicated by the appended claims.

What is claimed is:

1. An apparatus responsive to inertial forces from a reference means for releasing an escapement comprising:

a weight; a coil extension spring attached to said weight; means for mounting said spring to said reference means such that said weight rests upon said spring, said weight being moveable in at least all directions in a plane transverse of the axis of said spring;

cable means attached to said weight, said cable means being reciprocally moveable in response to at least non-axial oscillatory movement of said weight;

escapement means, said escapement means comprising first lever means attached to said cable means, said first lever means being mounted on a pivot;

catch means, said catch means comprising a first stop means; a second lever means, said second lever means being operative to rest against said stop means in a first position, said first lever means being moveable between said first position and a second position; third lever means mounted to a base pivot means, said third lever means including a second stop means at a position extended from said base pivot means for encountering said second lever means closely adjacent to the pivot of said second lever means for obtaining a mechanical advantage with respect to the end of said second lever means when said second lever means is resting against said first stop means, said third lever means being biased to urge such second lever means against said first stop means; wherein said second position releases for movement said second lever arm from said first stop means; and means responsive to movement of said third lever means for releasing pressurized gas.

2. The apparatus according to claim 1 wherein said gas releasing means comprises a trigger plate, a block, a firing pin, and means responsive to said firing pin for releasing said pressurized gas into said block, said trigger plate being mechanically attached to said third lever means and being disposed to forcibly urge said firing pin through said block, said block comprising a shaft for carrying said firing pin, means for attaching said releasable gas supply to said block disposed to encounter said firing pin for causing said pressurized gas to be released into said block upon release of said escapement.

3. The apparatus according to claim 2 wherein said firing pin comprises a piston having a sharpened point on a hollow shaft, said hollow shaft providing a path for pressurized gas into a manifold defined by said block.

4. The apparatus according to claim 3 wherein said pressurized gas supply is a pressurized fluid contained in a pressure bottle, said pressure bottle having a sealed cap puncturable in response to said firing pin.

5. The apparatus according to claim 3 wherein said firing pin further includes means for restraining axial movement of said firing pin.

6. An apparatus for use with a pre-existing nonautomatic valve having a mechanical stem movable between a first position and a second position on application of a not insubstantial minimum force, one of said positions being open and the other one of said positions being closed, said apparatus for moving said stem between said first position and said second position in response to pneumatic pressure, said apparatus comprising in combination:

a mounting frame;
a pushrod;
a pneumatic cylinder;
an inertial movement sensor; and
a stem coupling;
said pneumatic cylinder being mounted to said mounting frame and containing a piston movable in response to said pneumatic pressure to apply said not insubstantial amount of force to said pushrod upon pressurization of said pressure chamber comprising said cylinder and a face of said piston;
said pushrod being mounted to said movable piston;
said stem coupling being movably mounted to said mounting frame and being movable in response to movement of said pushrod;
said mounting frame being removably mountable in a position around said nonautomatic valve for removably attaching said stem coupling to said stem;
said inertial movement sensor comprising a weight, a coil extension spring attached to said weight, means for mounting said spring to an inertial reference means such that said weight rests upon said spring, said weight being movable in at least all directions in a plane transverse of the axis of said spring, cable means attached to said weight, said cable means being reciprocally movable in response to at least non-axial oscillatory movement of said weight, escapement means, said escapement means comprising first lever means attached to said cable means, said first lever means being mounted on a pivot, and catch means, said catch means comprising a stop means and a second lever means, said second lever means being operative to rest against said stop means in a first position, said first lever means being movable between a first point and a second point, wherein said second point releases for movement said second lever arm from said stop means to release pressurized gas, said pressurized gas being coupled to said pneumatic cylinder.

7. The apparatus according to claim 6 wherein said catch means comprises a bearing rotatably mounted to said stop means and about an axis transverse of motion of said first lever means for minimizing friction in said catch means.

8. The apparatus according to claim 6 wherein the distance between said mounting means and said weight is adjustable and wherein the length of said spring means is adjustable for adjusting resonant response frequency of said weight and spring to respond to oscillatory inertial movement in a selected predefined frequency range.

9. The apparatus according to claim 8 wherein said weight and said spring are insensitive to oscillatory inertial movement of said reference below a predetermined threshold of force.

* * * * *